Aug. 9, 1955     V. G. BOGER     2,715,085
FUEL CONTAINER
Filed April 24, 1951
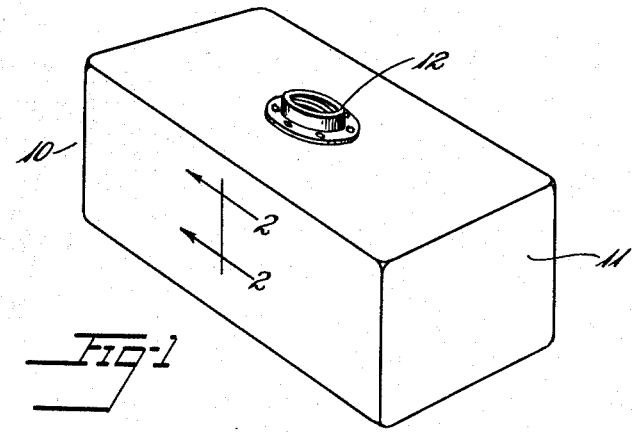
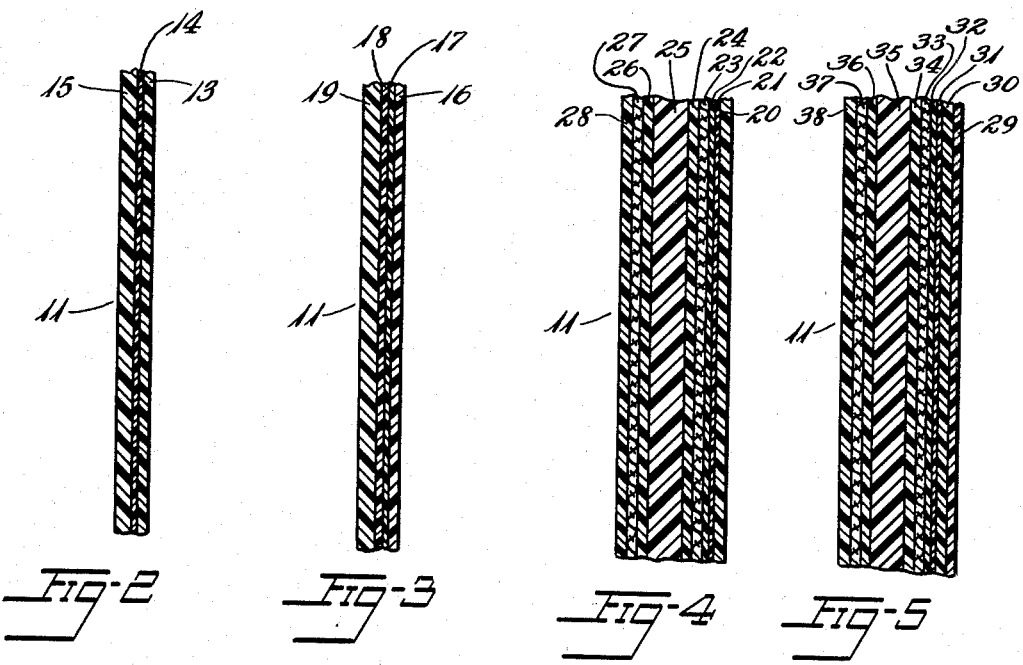
Inventor
Vernon G. Boger
By Robert W. Furlong
Atty.

United States Patent Office 2,715,085
Patented Aug. 9, 1955

2,715,085
FUEL CONTAINER

Vernon G. Boger, Akron, Ohio, assignor to The B. F. Goodrich Company, New York, N. Y., a corporation of New York Application April 24, 1951, Serial No. 222,671

2 Claims. (Cl. 154—43.5)

This invention relates to a fuel container and pertains more particularly to a light weight fuel container, such as the gasoline and oil fuel cells employed in aircraft, having a gasoline-impervious barrier therein and the method of making same.

It is an object of this invention to provide a light weight flexible fuel tank and the like which may be employed in aircraft and which prevents a fuel, such as gasoline or oil or other liquid hydrocarbon fuel, confined in the tank from penetrating the tank wall causing it to deteriorate.

It is another object of this invention to provide a light weight flexible fuel cell and the like having a gasoline-impervious barrier therein which barrier has a flexible resilient rubber-like material comprising an alpha-methylene nitrile rubber disposed over its inner and outer faces to protect it from deterioration.

Another object of this invention is to provide a fuel tank and the like having a gasoline-impervious barrier therein which is less susceptible to having "blisters" formed in the barrier during the vulcanization of the tank than fuel tanks of conventional construction having fuel-impervious barriers therein.

It is also an object of this invention to provide a laminated fuel container having a gasoline-impervious barrier therein in which improved adhesion is obtained between the gasoline-impervious barrier and its adjacent rubbery layers as compared with fuel tanks having a conventional gasoline-impervious barrier included therein.

Still another object of this invention is to provide a puncture-sealing fuel cell which prevents a fluid confined therein from diffusing or leaking through the tank wall to the exterior wall surfaces of the cell causing a serious fire hazard, if the fluid is of an inflammable nature.

A further object of this invention is to provide a method of making a puncture-sealing fuel tank and the like which is convenient and economical.

Other objects of this invention will be apparent from the drawings and description which follow.

In the construction of flexible resilient fuel tanks, such as fuel cells employed in aircraft for confining gasoline, it has been found necessary to incorporate into the laminated structure of the tank wall a flexible gasoline impervious barrier to prevent hydrocarbon fuels confined in the tank from diffusing through the tank wall causing deterioration thereof and the ultimate destruction of the confining properties of the tank. Also, the gasoline-impervious barrier in preventing the diffusion of fuel through the tank wall eliminates the serious fire hazard created by fuel which has leaked through the tank wall to the outer surfaces of the tank. Fuel cells of conventional construction having gasoline-impervious barriers therein have been difficult and expensive to manufacture, however, in that blisters are frequently formed in the barrier during the vulcanization of the fuel tank rendering the tank unsatisfactory and also because the adhesion between a conventional gasoline-impervious barrier and the layers or plies adhered thereto frequently is unsatisfactory causing separation of these plies and destruction of the utility of the tank.

The present invention satisfies all of the objectives set forth above and eliminates the deficiencies inherent in fuel tanks heretofore known by providing a fuel tank having a gasoline-impervious barrier therein which is protected from deterioration by a protective rubbery composition disposed over its inner and outer faces.

In teaching my invention four embodiments of this invention are shown and described, however it will be understood that I do not intend to limit this invention to these embodiments.

In the drawings:

Fig. 1 is a view in perspective of a fuel cell within the purview of this invention;

Fig. 2 is a section on the line 2—2 of Fig. 1 showing one embodiment of this invention;

Fig. 3 is a section on the line 2—2 of Fig. 1 showing another embodiment of this invention;

Fig. 4 is a section on the line 2—2 of Fig. 1 showing a third embodiment of this invention; and Fig. 5 is a section on the line 2—2 of Fig. 1 showing a fourth embodiment of this invention.

Referring to the drawings, Fig. 1 shows a relatively flexible non-metallic fuel cell 10 for confining gasoline or oil and the like having a tank wall 11 and a tank fitting 12 for forming an opening in tank wall 11 to enable fuel connections or the like to be inserted into the tank.

In one embodiment of this invention, as shown in Fig. 2, tank wall 11 comprises a flexible resilient liner ply 13 comprising a gasoline-resistant rubber-like alpha-methylene nitrile polymer, such as a butadiene-acrylonitrile copolymer, a gasoline-impervious barrier 14 comprising a polymer of a monomeric material comprising predominantly a chloroethylene having from one to two chlorine atoms attached to one only of the carbon atoms disposed over the outer face of liner ply 13, and a flexible resilient cover ply 15 comprising a gasoline-resistant alpha-methylene nitrile polymer, such as a butadiene-acrylonitrile copolymer, disposed over the outer face of barrier 14.

Barrier 14 comprises a polymer of a monomeric material including predominantly a chloroethylene having from one to two chlorine atoms attached to one only of the carbon atoms, such as vinylidene chloride and vinyl chloride, and desirably comprises an interpolymer obtained by the polymerization of at least two monomers including a chloroethylene having from one to two chlorine atoms attached to one only of the carbon atoms and an alpha-methylene nitrile such as acrylonitrile, methacrylonitrile, ethacrylonitrile and the like. Preferably the polymer of barrier 14 comprises from 50 to 100 percent by weight of a combined chloroethylene having from one to two chlorine atoms attached to one only of the carbon atoms and from 0 to 50 percent by weight of a combined alpha-methylene nitrile. For best results, it is desirable to use a copolymer of vinylidene chloride and acrylonitrile, preferably a copolymer of vinylidene chloride and acrylonitrile in which the combined acrylonitrile content is from 15 to 30 percent by weight. If it is desired, a heat stabilizer for vinyl halide resins, such as basic lead carbonate, lead oxide, alkaline earth silicates, titanium dioxide, lead phenolate, lead silicate, or the like, may be included in the barrier composition; preferably an inorganic lead heat stabilizer for vinyl halide resins is used in an amount from 0.1 to 10.0 percent by weight. A plasticizer for vinyl resins, such as di-glycerol, may also be included, if desired, preferably in an amount from 0.1 to 5.0 percent by weight.

The composition of barrier 14 may be applied over the outer face of liner 13 or over the inner face of cover ply 15 in the form of a preformed sheet or film of the composition, but is preferably applied as a solution or paste of the composition obtained by dissolving the composition in an appropriate volatile solvent, such as methyl ethyl ketone or cyclohexanone or the like, and is applied in any conventional manner, such as by spraying, brushing, spreading, etc., subsequently allowing the solvent to evaporate from the coating providing a gasoline-impervious film or coating of the composition. To obtain optimum results, it is preferable that barrier 14 be from about .001 inch to about .01 inch thick.

Because of the instability of polymers comprising a combined chloroethylene having from one to two chlorine atoms attached to one only of the carbon atoms to heat and various chemical substances, a flexible rubbery protective composition is disposed over the inner and outer faces of barrier 14 which in the present embodiment of this invention not only serves to protect barrier 14 from deterioration but also provides a liner member 13 over the inner face of barrier 14 and a cover member 15 over the outer face of barrier 14 which tend to cushion and protect barrier 14 from sudden impact stresses. Cover ply 15 disposed over the outer face of barrier 14 and liner ply 13 disposed over the inner face of barrier 14 comprise a rubbery alpha-methylene nitrile polymer, such as a polymer obtained by the polymerization of at least two monomers including a butadiene, such as butadiene-1,3; 2,3-dimethyl butadiene-1,3; 1,4-dimethyl butadiene-1,3, or the like, and an alpha-methylene nitrile such as acrylonitrile, methacrylonitrile, ethacrylonitrile, or the like. To obtain optimum protection for barrier 14 it is preferable that the polymer of liner ply 13 and cover ply 15 comprises from 15 to 50 percent by weight of combined acrylonitrile. Preferably the protective rubbery composition of liner ply 13 and cover ply 15 comprises from 3 to 50 percent by weight of a heat stabilizer for vinyl halide resins, such as basic lead carbonate, lead oxide, lead phenolate, lead silicate, alkaline earth silicates, titanium dioxide, dibutyl tin dilaurate, dibutyl tin maleate, dibutyl tin oxide, or the like. It is desirable, however, that the heat stabilizer for vinyl halide resins be inorganic and for best results is preferably an inorganic lead heat stabilizer for vinyl halide resins. Any gasoline-resistant rubbery conjugated diene polymer, such as the rubbery polymers of chloroprene, may be substituted for the rubbery alpha-methylene nitrile polymer in cover ply 15 without appreciably decreasing the desired protective characteristics of this layer. Appropriate compounding ingredients, such as fillers, reinforcing pigments, vulcanizing agents, accelerators, etc., may also be employed in the rubbery composition of the liner and cover members.

Typical examples of rubbery compositions which may be utilized in the protective rubbery composition disposed over the inner and outer faces of barrier 14 are illustrated by the following recipes which are included merely for purposes of illustration and are not intended to limit the scope of this invention.

*Example I*

| Material: | Parts by weight |
|---|---|
| Rubbery butadiene-acrylonitrile copolymer (26% by weight combined acrylonitrile) | 100.0 |
| Basic lead carbonate | 90.0 |
| Lead oxide | 10.0 |
| Sulfur | 2.0 |
| Stearic acid | 1.0 |
| Mercaptobenzothiazole | 1.5 |
| Total | 204.5 |

*Example II*

| Material: | Parts by weight |
|---|---|
| Rubbery butadiene-acrylonitrile copolymer (33% by weight combined acrylonitrile) | 100.0 |
| Carbon black | 30.0 |
| Calcium silicate | 5.0 |
| Sulfur | 20.2 |
| Stearic acid | 1.2 |
| Mercaptobenzothiazole | 1.4 |
| Total | 157.8 |

*Example III*

| Material: | Parts by weight |
|---|---|
| Rubbery butadiene-acrylonitrile copolymer (45% by weight combined acrylonitrile) | 100.0 |
| Carbon black | 50.0 |
| Lead oxide | 8.0 |
| Basic lead carbonate | 3.0 |
| Sulfur | 1.8 |
| Stearic acid | 1.5 |
| Mercaptobenzothiazole | 1.7 |
| Total | 166.0 |

The protective composition of liner ply 13 and cover ply 15 may be applied over the faces of barrier 14 in the form of a preformed unreinforced sheet or film of the material or as a solution or paste of the protective composition obtained by dissolving the protective rubbery composition in an appropriate volatile solvent, such as ethylene dichloride, trichloroethylene, chlorobenzene methyl acetate, methyl ethyl ketone, or the like, which is applied in any conventional manner, such as by spraying, brushing, spreading, etc., subsequently allowing the solvent to evaporate from the coating.

After liner 13, barrier 14 and cover ply 15 were assembled, the assembly was vulcanized for 15 minutes at 270° F. to form the assembly into an integral unit.

In another embodiment of this invention as shown in Fig. 3, tank wall 11 comprises a flexible resilient liner ply 16 of gasoline-resistant rubber-like material, which is the same as liner ply 13 of Fig. 2, a gasoline-impervious barrier 17, which is the same as barrier 14 shown in Fig. 2, disposed over the outer face of liner ply 16, a flexible resilient protective ply 18 disposed over the outer face of barrier 17, protective ply 18 comprising the same protective rubbery composition as used in cover ply 15 shown in Fig. 2 and described above, and a flexible resilient cover ply 19 of gasoline-resistant rubber-like material, such as neoprene and the like, disposed over the outer face of ply 18.

The laminated structure as shown in Fig. 3 was formed by disposing barrier 17 over the outer face of liner 16, as described above for the application of barrier 14 over liner ply 13, and by disposing ply 18 over the outer face of barrier 17, as described above in applying cover ply 15 over barrier 14. Cover ply 19 was disposed over ply 18 in the conventional manner and the assembled structure was vulcanized at 270° F. for 15 minutes.

In a third embodiment of this invention as shown in Fig. 4, tank wall 11 comprises a flexible resilient liner ply 20 of gasoline-resistant rubber-like material, which is the same as liner ply 13 of Fig. 2, a flexible gasoline-impervious barrier 21, which is the same as barrier 14 shown in Fig. 2, disposed over the outer face of liner 20, a flexible resilient protective ply 22 disposed over the outer face of barrier 21, which is the same as cover ply 15 shown in Fig. 2, a flexible fabric reinforcing member 23, preferably comprising a square-woven nylon fabric, disposed over the outer face of ply 22, a flexible resilient layer or ply 24 of rubbery material, such as neoprene or crude rubber, disposed over the outer face of reinforcing member 23, a flexible resilient sealant layer 25 of a conventional tacky cohesive rubbery sealant composition which will swell but not dissolve in hydrocarbon solvents disposed over the outer face of ply 24, a flexible resilient ply 26 of rubbery material, such as crude or neoprene rubber, disposed over sealant layer 25, a flexible fabric-reinforcing member 27, preferably comprising a square-woven nylon fabric, disposed over the outer face of ply 26, and a flexible resilient cover ply 28 of gasoline-resistant rubbery material, such as neoprene, disposed over the outer face of reinforcing member 27.

Liner 20, barrier 21 and protective ply 22 are laminated together as heretofore described, and reinforcing member 23, ply 24, sealant layer 25, ply 26, reinforcing member 27 and cover ply 28 are applied in any conventional manner to form the laminated structure of this embodiment. The laminated structure was vulcanized at 275° F. for 20 minutes to form the structure into an integral unit.

As shown in Fig. 5, a fourth embodiment of tank wall 11 within the purview of this invention comprises a flexible resilient liner ply 29 of gasoline-resistant rubber-like material, such as neoprene or a butadiene-acrylonitrile rubber, a flexible resilient protective ply 30, which comprises the same composition as cover ply 15 shown in Fig. 2, disposed over the outer face of liner ply 29, a flexible gasoline-impervious barrier 31, which is the same as barrier 14 shown in Fig. 2, disposed over the outer face of ply 30, a flexible resilient protective ply 32, which comprises the same composition as cover ply 15 shown in Fig. 2, disposed over the outer face of barrier 31, a flexible fabric-reinforcing member 33, preferably comprising a square-woven nylon fabric, disposed over the outer face of ply 32, a flexible resilient ply 34 of rubber-like material, such as neoprene or crude rubber, disposed over reinforcing member 33, a flexible resilient sealant layer 35 of a conventional tacky cohesive rubbery sealant composition which will swell but not dissolve in hydrocarbon solvents disposed over the outer face of ply 34, a flexible resilient ply 36 of rubber-like material, such as neoprene or crude rubber, disposed over the outer face of sealant layer 35, a flexible fabric-reinforcing member 37, preferably comprising a square-woven nylon fabric, disposed over the outer face of ply 36, and a flexible resilient cover ply 38 of gasoline-resistant rubber-like material, such as neoprene or a butadiene-acrylonitrile rubber, disposed over the outer face of reinforcing member 37. If desired, the fabric members may be treated or impregnated with a stiffening agent such as a phenol-aldehyde or urea-formaldehyde resin in order to provide additional rigidity and strength in the finished tank.

The laminated structure of the embodiment of this invention shown in Fig. 5 was formed by disposing ply 30 in an adherent contacting relationship over the outer face of liner 29 in the form of a preformed unreinforced film or sheet or in the form of a paste or solution, as described above. Barrier 31 is applied over the outer face of ply 30 in the manner described above in the application of barrier 14 to the outer face of liner 13. Ply 32 is applied over the outer face of barrier 31 as described in the embodiment of this invention shown in Fig. 2. The remaining layers or plies of tank wall 11 shown in Fig. 5 are applied in any conventional manner. The assembled structure was vulcanized for 15 minutes at 270° F. to form the laminate into an integral unit.

A fuel tank within the purview of this invention in providing a gasoline-impervious barrier in the wall of the tank prevents a fuel confined in the tank from diffusing or seeping through the wall of the tank which seepage would cause deterioration of the tank wall and the ultimate destruction of the confining properties of the tank and would cause a serious fire hazard to exist upon the seepage of the fuel to the outer surfaces of the tank.

Fuel cells within the purview of this invention in affording increased protection against seepage of hydrocarbon fuels into the tank wall as compared with conventional fuel cells are less susceptible to having ply separation occur caused by the detrimental effects of the fuel on the plies than fuel cells of conventional construction.

Furthermore, fuel tanks within the purview of this invention exhibit a more satisfactory adhesion between the gasoline-impervious barrier and the layers adjacent thereto than is normally experienced in fuel tanks of conventional construction.

Also, fuel tanks within the purview of this invention are not as susceptible to having the gasoline-impervious barrier "blister" during the vulcanization of the tank as conventional fuel tanks having gasoline-impervious barriers included therein.

In protecting the gasoline-impervious barrier of this invention from deterioration and embrittlement during vulcanization and subsequent use by the rubbery protective composition disposed over its faces, a fuel tank which is extremely durable and serviceable is provided.

While the invention has been described with particular reference to specific embodiments of the invention, it is clear that obvious variations and modifications are possible without departing from the spirit and scope of the invention as defined in the appended claims.

I claim:

1. A fuel tank having a laminated wall structure including a flexible resilient rubbery layer comprising a vulcanized rubbery butadiene-acrylonitrile copolymer and from 3 to 50 per cent by weight based on the total weight of the composition of a heat stabilizer for vinyl halide resins, a gasoline-impervious barrier layer comprising a copolymer of vinylidene chloride and acrylonitrile disposed over a face of said rubbery layer, and a second flexible rubbery layer comprising a vulcanized rubbery butadiene-acrylonitrile copolymer and from 3 to 50 per cent by weight based on the total weight of the composition of a heat stabilizer for vinyl halide resins disposed over the opposite face of said barrier layer, said layers all being adhered together throughout their extent.

2. A fuel tank having a laminated wall structure including a flexible resilient rubbery layer comprising (1) a vulcanized rubbery butadiene-acrylonitrile copolymer and (2) a heat stabilizer for vinyl halide resins, a gasoline-impervious barrier layer comprising a copolymer of vinylidene chloride and acrylonitrile disposed over a face of said rubbery layer, and a second flexible rubbery layer comprising (1) a vulcanized rubbery butadiene acrylonitrile copolymer and (2) a heat stabilizer for vinyl halide resins disposed over the opposite face of said barrier layer, said layers all being adhered together throughout their extent.

References Cited in the file of this patent

UNITED STATES PATENTS

| Number | Name | Date |
| --- | --- | --- |
| 2,278,777 | Garvey et al. | Apr. 7, 1942 |
| 2,310,449 | Light Bown et al. | Feb. 9, 1943 |
| 2,330,353 | Henderson | Sept. 28, 1943 |
| 2,446,811 | Crawford | Aug. 10, 1948 |
| 2,474,897 | Hauser | July 5, 1949 |
| 2,477,280 | Baldwin | July 26, 1949 |
| 2,480,680 | Stanton et al. | Aug. 30, 1949 |
| 2,497,123 | Frolich | Feb. 14, 1950 |
| 2,558,807 | Bailey | July 3, 1951 |
| 2,570,829 | Maxey et al. | Oct. 9, 1951 |
| 2,581,920 | Kuhn | Jan. 8, 1952 |